(12) United States Patent
Moshe et al.

(10) Patent No.: US 7,907,248 B2
(45) Date of Patent: Mar. 15, 2011

(54) MOVIE COPY PROTECTION

(75) Inventors: Kfir Moshe, Jerusalem (IL); Gavriel Benaily, Modiin (IL); Or Taieb, Carme-Yosef (IL); Perry Smith, Maale Adumim (IL); Shlomo Kipnis, Jerusalem (IL)

(73) Assignee: NDS Limited, Staines, Middlesex (GB)

( * ) Notice: Subject to any disclaimer, the term of this patent is extended or adjusted under 35 U.S.C. 154(b) by 488 days.

(21) Appl. No.: 11/920,900

(22) PCT Filed: Jul. 12, 2006

(86) PCT No.: PCT/IL2006/000809
§ 371 (c)(1),
(2), (4) Date: Feb. 20, 2008

(87) PCT Pub. No.: WO2007/023482
PCT Pub. Date: Mar. 1, 2007

(65) Prior Publication Data
US 2009/0128779 A1   May 21, 2009

Related U.S. Application Data

(60) Provisional application No. 60/710,054, filed on Aug. 22, 2005, provisional application No. 60/710,264, filed on Aug. 22, 2005, provisional application No. 60/710,048, filed on Aug. 22, 2005.

(51) Int. Cl.
*G03B 21/32* (2006.01)
(52) U.S. Cl. .............................. 352/40; 352/85; 352/204
(58) Field of Classification Search .................... 352/40, 352/41, 44, 45, 81, 84, 239, 236, 92, 97, 352/204, 85
See application file for complete search history.

(56) References Cited

U.S. PATENT DOCUMENTS

| | | | |
|---|---|---|---|
| 1,498,433 A | 6/1924 | Bouin |
| 1,610,423 A | 12/1926 | Cawley |
| 1,759,777 A | 5/1930 | Cawley |
| 2,983,190 A | 5/1961 | Betz et al. |
| 3,469,837 A | 9/1969 | Hellig |
| 3,598,470 A | 8/1971 | Vetter |
| 3,622,223 A | 11/1971 | Brakell |
| 3,712,708 A | 1/1973 | Brown |
| 3,964,822 A | 6/1976 | Yamashita |
| 4,297,723 A | 10/1981 | Whitby |
| 5,121,252 A | 6/1992 | Okada et al. |

(Continued)

FOREIGN PATENT DOCUMENTS

EP        0 897 243 A1      2/1999

(Continued)

OTHER PUBLICATIONS

Dec. 16, 2009 Supplementary European Search Report in connection with EP 06 76 6131.4.

(Continued)

*Primary Examiner* — William C Dowling
(74) *Attorney, Agent, or Firm* — Husch Blackwell LLP

(57) ABSTRACT

A method for frustrating piracy of a movie, the movie including a plurality of filmed frames, each of the filmed frames including an image, the method including editing the movie prior to projection such that different regions of the image of one of the filmed frames are in different frames so that the different regions will be projected at different times, and repeating the editing for other ones of the filmed frames. Related apparatus and methods are also described.

9 Claims, 12 Drawing Sheets

U.S. PATENT DOCUMENTS

| | | | |
|---|---|---|---|
| 5,651,065 A | 7/1997 | Stufflet et al. | |
| 5,680,454 A | 10/1997 | Mead | |
| 5,837,346 A | 11/1998 | Langille et al. | |
| 5,959,717 A | 9/1999 | Chaum | |
| 6,309,072 B1 | 10/2001 | Deter | |
| 6,421,174 B1 | 7/2002 | Ooshima et al. | |
| 6,529,600 B1 | 3/2003 | Epstein et al. | |
| 6,741,323 B2 * | 5/2004 | Plunkett | 352/90 |
| 6,894,835 B2 | 5/2005 | Ohsako et al. | |
| 7,302,162 B2 * | 11/2007 | Beaton | 386/224 |
| 7,470,032 B2 * | 12/2008 | Damera-Venkata et al. | 353/94 |
| 7,634,134 B1 * | 12/2009 | So | 382/173 |
| 7,693,330 B2 * | 4/2010 | So | 382/174 |
| 2003/0169404 A1 | 9/2003 | Weisgerber | |
| 2003/0202576 A1 | 10/2003 | Enright | |
| 2004/0033051 A1 | 2/2004 | Ip | |
| 2004/0033060 A1 | 2/2004 | Beaton | |
| 2004/0091110 A1 | 5/2004 | Barkans | |
| 2004/0098753 A1 | 5/2004 | Reynolds et al. | |
| 2004/0258272 A1 | 12/2004 | Fan | |
| 2005/0200952 A1 | 9/2005 | Niwa et al. | |
| 2005/0243278 A1 | 11/2005 | Li et al. | |
| 2005/0248843 A1 | 11/2005 | Maruta et al. | |
| 2005/0265577 A1 | 12/2005 | DeCegama | |

FOREIGN PATENT DOCUMENTS

| | | |
|---|---|---|
| EP | 0897243 | 2/1999 |
| EP | 1 345 428 A2 | 9/2003 |
| EP | 1 202 079 B1 | 1/2006 |
| EP | 1 986 428 A1 | 10/2008 |
| WO | WO 00/74366 A2 | 12/2000 |
| WO | WO 01/31398 A1 | 5/2001 |
| WO | WO 03/089987 A1 | 10/2003 |
| WO | WO 2004/010681 A2 | 1/2004 |
| WO | WO 2004/066626 A1 | 8/2004 |

OTHER PUBLICATIONS

Nov. 22, 2010 European Search Report in connection with EP 10 17 7664.9 (4 pgs.).

James Cielen, "There's No Trick to Good Vision" (2003), available at http://www.dovemagic.com/opt.htm.

Joshua Rodefer, "What are the processes of the brain and eyes when reading?" (Jan. 6, 1999), available at http://www.madsci.org/posts/archives/jan99/915703204.Ns.r.html.

"Flicker fusion Threshold", available at http://en.wikipedia.org/wiki/Flicker_fusion_threshold.

"Frame rate", previously found but no longer available at http//www.absoluteastronomy.com/encyclopedia/f/fr/frame_rate.htm.

"How Does the Human Eye Work?", available at http://www.pasadenaeye.com/faq/faq15/faq15_text.html.

"How Movie Screens Work", available at http://entertainment.howstuffworks.com/movie-screen.htm.

"Persistence of Vision", available at http://en.wikipedia.org/wiki/Persistence_of_Vision.

"Spinning Wheels" from on-line Self-Service Science Forum Message (Sep. 16-19, 1999), available at http://www2.abc.net.au/science/k2/stn-archive1/posts/topic38076.shtm.

"World TV Standards", available at http://scatmag.com/technical_/worldtv.pdf.

"WP's SloMo High-Speed imaging, high-speed cameras, Slow Motion and High Speed Video-what's that?", available at http://www.fen-net.de/walter/preiss/e/slomo.html, Aug. 21, 2005.

* cited by examiner

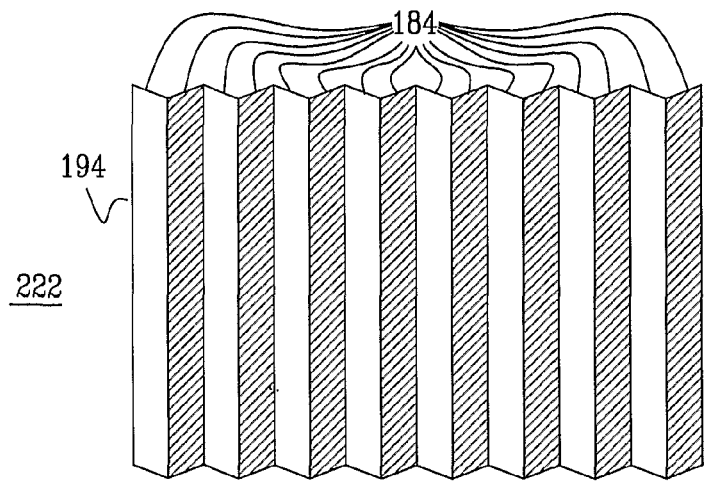
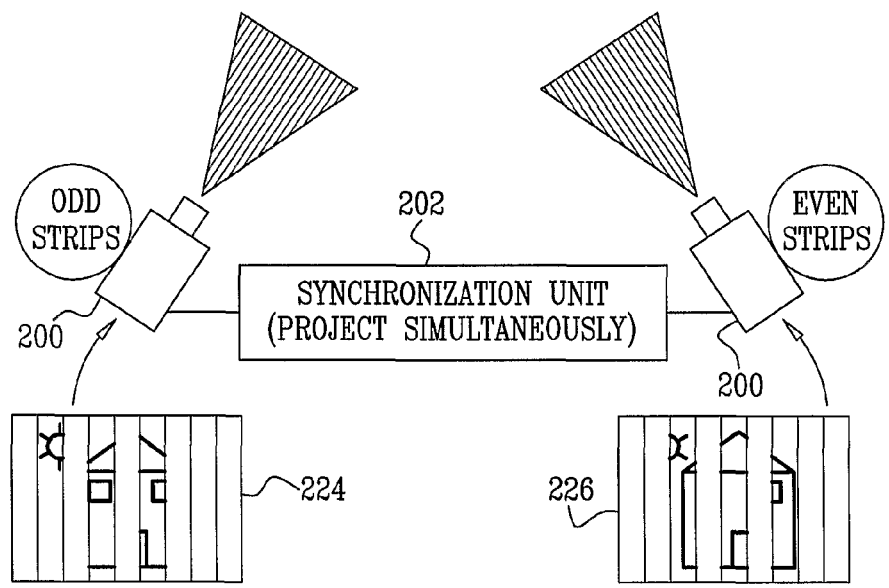
FIG. 23

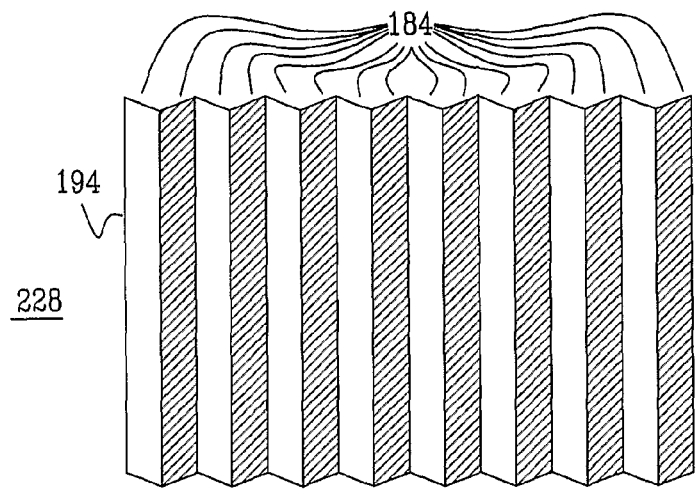
FIG. 24
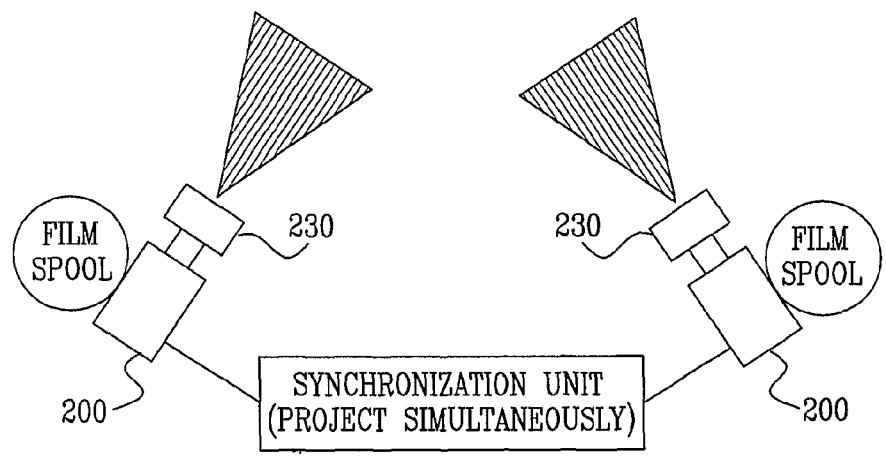
FIG. 25
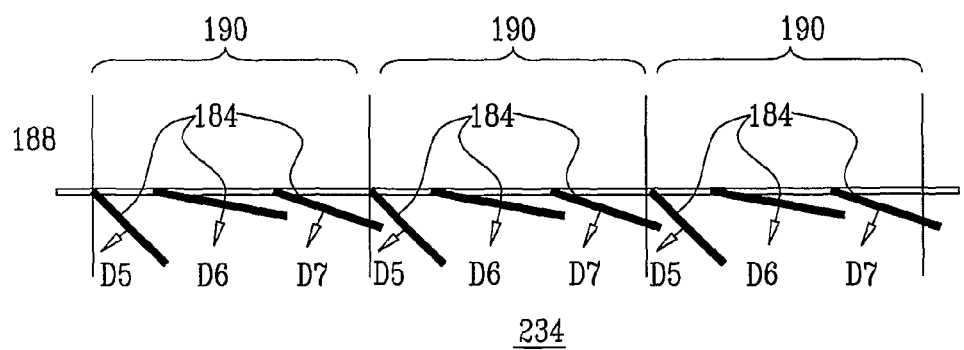

MOVIE COPY PROTECTION

RELATED APPLICATION INFORMATION

The present application is a 35 USC §371 application of PCT/IL2006/000809, filed on 12 Jul. 2006 and entitled "Movie Copy Protection", which was published on 1 Mar. 2007 in the English language with International Publication Number WO 2007/023482 and which relies for priority on U.S. Provisional Patent Applications Ser. No. 60/710,054, Ser. No. 60/710,048 and Ser. No. 60/710,264 of Moshe, et al. filed 22 Aug. 2005, the disclosures of which are hereby incorporated herein by reference.

FIELD OF THE INVENTION

The present invention relates to movie copy protection.

BACKGROUND OF THE INVENTION

A frustrating problem in the movie industry is the pirating of movies shown in a movie theater. Movie pirates typically enter a first run theater, video tape the movie off of the screen and then release pirated versions of the first run movie on video tape to the public.

The following references are believed to represent the state of the art:
U.S. Pat. No. 1,498,433 to Bouin;
U.S. Pat. No. 1,610,423 to Cawley;
U.S. Pat. No. 1,759,777 to Cawley;
U.S. Pat. No. 2,983,190 to Betz, et al.;
U.S. Pat. No. 3,469,837 to Heilig;
U.S. Pat. No. 3,622,223 to Brackell;
U.S. Pat. No. 3,712,708 to Brown;
U.S. Pat. No. 3,598,470 to Vetter;
U.S. Pat. No. 3,964,822 to Yamashita;
U.S. Pat. No. 4,297,723 to Whitby;
U.S. Pat. No. 5,121,252 to Okada, et al.;
U.S. Pat. No. 5,651,065 to Stufflet, et al.;
U.S. Pat. No. 5,680,454 to Mead;
U.S. Pat. No. 5,837,346 to Langille, et al.;
U.S. Pat. No. 5,959,717 to Chaum;
U.S. Pat. No. 6,309,072 to Deter;
U.S. Pat. No. 6,421,174 to Ooshima, et al.;
U.S. Pat. No. 6,529,600 to Epstein, et al;
U.S. Pat. No. 6,894,835 to Ohsako, et al.;
US Published Patent Application 2003/0169404 of Weisgerber;
US Published Patent Application 2003/0202576 of Enright;
US Published Patent Application 2004/0091110 of Barkans;
US Published Patent Application 2004/0098753 of Reynolds, et al.;
US Published Patent Application 2004/0033051 of IP;
US Published Patent Application 2004/0258272 of Fan;
US Published Patent Application 2005/0200952 of Niwa, et al.;
US Published Patent Application 2005/0243278 of Li, et al.;
US Published Patent Application 2005/0248843 of Maruta, et al.;
US Published Patent Application 2005/0265577 of DeCegama;
European Published Patent Application EP 1202079 of Arsenich;
European Published Patent Application EP 0897243 of France Telecom;
PCT Published Patent Application WO 00/74366 of Digital Electronic Cinema, Inc.;
PCT Published Patent Application WO 01/31398 of Giry;
PCT Published Patent Application WO 03/089987 of Erlas Erlanger Lasertechnik GMBH;
PCT Published Patent Application WO 2004/010681 of Spitz, Inc.; and
PCT Published Patent Application WO 2004/066626 of Koninklijke Philips Electronics N.V.

The disclosures of all references mentioned above and throughout the present specification, as well as the disclosures of all references mentioned in those references, are hereby incorporated herein by reference.

SUMMARY OF THE INVENTION

The present invention seeks to provide a system for frustrating movie piracy.

The system and method of the present invention, in preferred embodiments thereof, frustrates movie piracy by splitting each frame of a movie into two or more replacement-frames. Each of the replacement-frames is projected one at a time, such that the replacement-frames of an original frame are typically projected one after the other.

The projection of the individual replacement-frames results in a pirated movie with substantial degradation, so that an illegal copy will be a very low quality copy, and therefore practically unusable. However, the splitting is not noticed by the human eye.

The system and method of the present invention, in preferred embodiments thereof, also frustrates movie piracy by changing the frame rate during projection and/or by excluding individual frames from being projected by editing or by using a suitable shutter associated with the movie projector.

The system of the present invention, in preferred embodiments thereof, also includes using a screen having one or more projections and/or depressions over the screen surface, so that the image recorded by a pirate camcorder is degraded due to uneven reflections from the screen, thereby leading to a pirated copy of the movie that is practically useless. On the other hand, the human eye has an extraordinary ability to adjust itself to differences in light, so that a viewer generally watches the movie without any noticeable disturbances.

There is thus provided in accordance with a preferred embodiment of the present invention, a method for frustrating piracy of a movie, the movie including a plurality of filmed frames, each of the filmed frames including an image, the method including editing the movie prior to projection such that different regions of the image of one of the filmed frames are in different frames so that the different regions will be projected at different times, and repeating the editing for other ones of the filmed frames.

Further in accordance with a preferred embodiment of the present invention the different regions are non-intersecting regions of the image of the one filmed frame.

Still further in accordance with a preferred embodiment of the present invention, the method includes physically duplicating the one filmed frame yielding a first projected frame and a second projected frame, the first projected frame including one of the different regions, the second projected frame including another of the different regions.

Additionally in accordance with a preferred embodiment of the present invention the editing includes editing out at least one region in each of the first projected frame and the second projected frame leaving behind the different regions.

Moreover in accordance with a preferred embodiment of the present invention, the method includes analyzing the image of the one filmed frame in order to decide a most suitable way to divide up the image of the one filmed frame thereby determining the different regions.

Further in accordance with a preferred embodiment of the present invention a shape of at least one of the different regions changes between the one filmed frame and another one of the filmed frames.

Still further in accordance with a preferred embodiment of the present invention a location of at least one of the different regions changes between the one filmed frame and another one of the filmed frames.

Additionally in accordance with a preferred embodiment of the present invention an orientation of at least one of the different regions changes between the one filmed frame and another one of the filmed frames.

There is also provided in accordance with still another preferred embodiment of the present invention a method for frustrating piracy of a movie, the movie including a sequence of a plurality of frames, each of the frames including an image, the frames including a pair of frames including a first frame and a second frame, the method including preventing projection of a first region of the first frame and a second region of the second frame, the first frame being adjacent to the second frame in the sequence of the frames, the first region covering a different region of the frames than the second region, and repeating the preventing for other adjacent pairs of the filmed frames.

Moreover in accordance with a preferred embodiment of the present invention prior to the preventing, the image of the first frame is substantially the same as the image of the second frame.

Further in accordance with a preferred embodiment of the present invention the preventing includes physically editing out the first region from the first frame and the second region from the second frame prior to projection of the movie.

Still further in accordance with a preferred embodiment of the present invention, the method includes providing a movie projector having a shutter, and wherein the preventing includes projecting the movie such that the shutter selectively prevents projection of the first region for the first frame and the second region for the second frame.

Additionally in accordance with a preferred embodiment of the present invention a shape of the first region and a shape of the second region changes between the pair and another pair of the frames.

Moreover in accordance with a preferred embodiment of the present invention a location of at least one of the first region and the second region changes between the pair and another pair of the frames.

Further in accordance with a preferred embodiment of the present invention an orientation of at least one of the first region and the second region changes between a pair and another pair of the frames.

There is also provided in accordance with still another preferred embodiment of the present invention a movie projector system for frustrating piracy of a movie, the movie including a sequence of a plurality of frames, each of the frames including an image, the frames including a pair of frames including a first frame and a second frame, the system including a spool assembly to spool the movie, a lamp and lens assembly mechanically connected to the spool assembly, a shutter mechanically connected to the lamp and lens assembly, the shutter being operative to prevent projection of at least one region of at least one of the frames, and a shutter controller operationally connected to the shutter, the shutter controller being operative to control the shutter such that projection of a first region of the first frame and a second region of the second frame is prevented, the first frame being adjacent to the second frame in the sequence of the frames, the first region covering a different region of the frames than the second region.

Still further in accordance with a preferred embodiment of the present invention prior to the projection, the image of the first frame is substantially the same as the image of the second frame.

Additionally in accordance with a preferred embodiment of the present invention the shutter controller being operative to control the shutter such that a shape of the first region and a shape of the second region changes between the pair and another pair of the frames.

Moreover in accordance with a preferred embodiment of the present invention the shutter controller being operative to control the shutter such that a location of at least one of the first region and the second region changes between the pair and another pair of the frames.

Further in accordance with a preferred embodiment of the present invention the shutter controller being operative to control the shutter such that an orientation of at least one of the first region and the second region changes between a pair and another pair of the frames.

There is also provided in accordance with still another preferred embodiment of the present invention a method for frustrating piracy of a movie, the movie including a sequence of a plurality of frames, the method including at least one of removing and duplicating some of the frames of a first section of the movie so that the first section can be projected at a first projection rate, and at least one of removing and duplicating some of the frames of a second section of the movie so that the second section can be projected at a second projection rate which is different to the first projection rate, so that the projection of the first section at the first projection rate and the projection of the second section at the second projection rate is perceived by a viewer as being projected at a constant rate.

Still further in accordance with a preferred embodiment of the present invention a duration of the projection of the first section at the first projection rate is the same as a duration of the projection of the second section at the second projection rate.

Additionally in accordance with a preferred embodiment of the present invention a duration of the projection of the first section at the first projection rate is different to a duration of the projection of the second section at the second projection rate.

There is also provided in accordance with still another preferred embodiment of the present invention a movie projector system for frustrating piracy of a movie, the movie including a sequence of a plurality of frames, the system including a spool assembly to spool the movie, a lamp and lens assembly mechanically connected to the spool assembly, a shutter mechanically connected to the lamp and lens assembly, the shutter being operative to selectively exclude individual frames from being projected, and a shutter controller operationally connected to the shutter, the shutter controller being operative to control the shutter such that a first number of the frames of a first section of the movie are excluded from projection, and a second number of the frames of a second section of the movie are excluded from projection, wherein the first number is not equal to the second number.

Moreover in accordance with a preferred embodiment of the present invention a duration of the projection of the first section takes is the same as a duration of the projection of the second section.

Further in accordance with a preferred embodiment of the present invention a duration of the projection of the first section is different from a duration of the projection of the second section.

There is also provided in accordance with still another preferred embodiment of the present invention a movie screen apparatus, including a projection surface having a plurality of edges, and an anti-piracy surface feature disposed on the projection surface, the feature including two strips, each of the strips including two edges, the edges of the strips extending from one of the edges of the projection surface to another one of the edges of the projection surface, one of the edges of the strips being connected to the projection surface, another one of the edges of the strips connecting the strips, a minimum angle between the strips being greater than 90 degrees and less than 180 degrees, the strips having a minimum width of 0.5 cm.

There is also provided in accordance with still another preferred embodiment of the present invention a movie screen apparatus, including a projection surface having a plurality of edges, the projection surface including a plurality of strips, each of the strips including two edges, the edges of the strips extending from one of the edges of the projection surface to another one of the edges of the projection surface the strips having a minimum width of 0.5 cm, different ones of the strips facing in different directions.

Still further in accordance with a preferred embodiment of the present invention the strips are connected to each other at the edges of the strips, a minimum angle between the strips being greater than 90 degrees and less than 180 degrees.

Additionally in accordance with a preferred embodiment of the present invention the strips are arranged in a plurality of groups, each of the groups forming a pattern, the pattern repeating for each of the groups, different ones of the strips in each group facing in the different directions.

Moreover in accordance with a preferred embodiment of the present invention different ones of the strips in each group face in at least four different directions.

Further in accordance with a preferred embodiment of the present invention the strips form a non-continuous surface having gaps between the strips.

There is also provided in accordance with still another preferred embodiment of the present invention a method for frustrating piracy of a movie, including providing a movie screen including a plurality of strips, the strips being arranged in a plurality of groups, each of the groups forming a pattern, the pattern repeating for each of the groups, different ones of the strips in each group facing at least two different directions, providing a synchronized projector arrangement, and arranging the projection arrangement so as to project the movie from a plurality of different orientations relative to the screen on to the strips facing the different directions.

Still further in accordance with a preferred embodiment of the present invention, the method includes synchronizing the projection arrangement so as to selectively project alternately in each one of the different directions.

Additionally in accordance with a preferred embodiment of the present invention the projection arrangement includes a plurality of synchronized projectors, each of the projectors being associated with one of the different directions.

Moreover in accordance with a preferred embodiment of the present invention, the method includes projecting from the different orientations on to the strips simultaneously.

Further in accordance with a preferred embodiment of the present invention the projecting is performed such that there is no overlap of the movie on the screen from the different orientations.

Still further in accordance with a preferred embodiment of the present invention the projecting is performed without the overlap using complementary filters disposed on the projection arrangement.

Additionally in accordance with a preferred embodiment of the present invention the projection arrangement includes a plurality of synchronized projectors, each of the projectors being associated with one of the different directions, the projecting is performed without the overlap by editing, for each of the projectors, a copy of the movie in order to remove non-projected parts of the copy.

Moreover in accordance with a preferred embodiment of the present invention the strips form a non-continuous surface having gaps between the strips.

BRIEF DESCRIPTION OF THE DRAWINGS

The present invention will be understood and appreciated more fully from the following detailed description, taken in conjunction with the drawings in which:

FIG. 23 is a partly pictorial, partly block diagram view of a multi-projector anti-piracy system constructed and operative in accordance with an alternative preferred embodiment of the present invention for use with the movie screen apparatus of FIG. 20;

FIG. 24 is a partly pictorial, partly block diagram view of a multi-projector anti-piracy system constructed and operative in accordance with another alternative preferred embodiment of the present invention for use with the movie screen apparatus of FIG. 20; and FIG. 25 is a schematic top view of a movie screen apparatus constructed and operative in accordance with another alternative preferred embodiment of the present invention.

DETAILED DESCRIPTION OF A PREFERRED EMBODIMENT

By way of introduction, the human eye does not generally discern the difference between images projected at 24 frames per second and images projected at 100 frames per second, by way of example, since human flicker fusion threshold is usually about 16 frames per second.

It is generally necessary for a digital camcorder, which is being used to film a projected movie off screen, to be synchronized with the projection frame rate of the movie in order to capture a relatively normal quality image. The refresh rate of the camcorder has to be reasonably near to the projection frame rate.

It is common in the television and cinema industries to use some techniques of frame multiplication in order to create a fluid projection. For example, most movies are shot at 24 frames per second, but the ordinary rate of movie projection in theatres is generally 48 frames per second, so that the frames are doubled prior to projection.

The present invention, in preferred embodiments thereof, exploits the occurrence of Human Vision Persistence. A critical part of understanding the visual perception phenomena of the human eye is that the human eye is not a video camera: there is no "frame rate" or "scan rate" in the eye.

Figure 1:
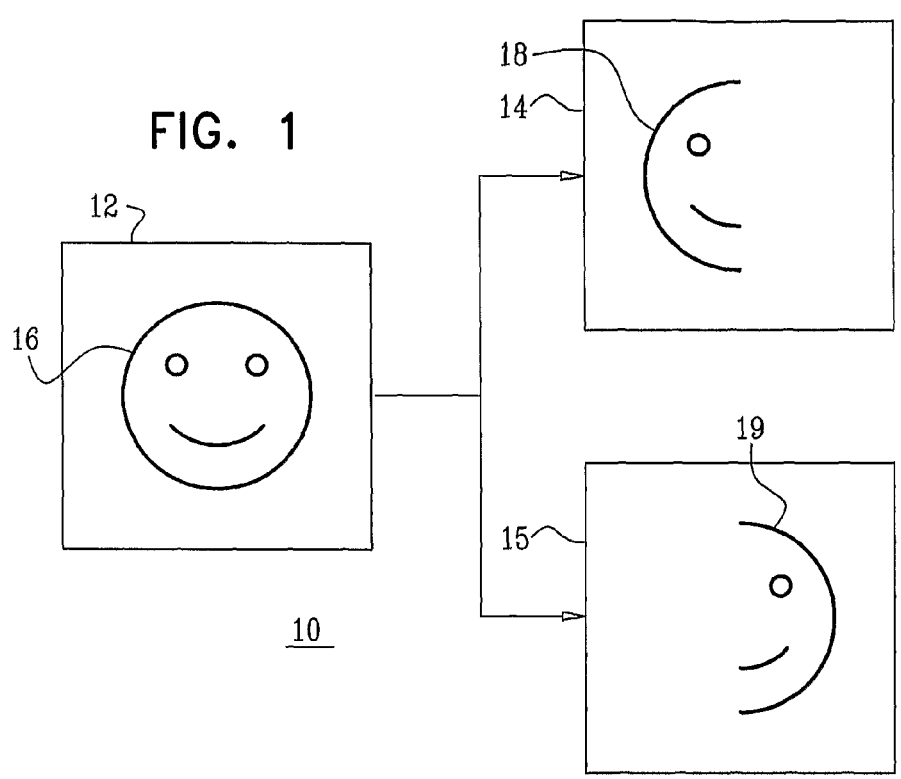
FIG. 1 is a simplified pictorial illustration of frame division in an anti-piracy system constructed and operative in accordance with a preferred embodiment of the present invention.

Reference is now made to FIG. 1, which is a simplified pictorial illustration of frame division in an anti-piracy system 10 constructed and operative in accordance with a preferred embodiment of the present invention. Frame division typically includes replacing each of the original filmed frames by two or more replacement frames. FIG. 1 describes frame division, by way of a non-limiting example, by replicating an original frame 12 of a movie twice to form two replacement frames 14, 15. The original frame 12 has an image 16. The image 16 is now divided into two strips 18, 19 between the replacement frames 14, 15, respectively. Therefore, the replacement frames 14, 15 are produced from the original frame 12. The replacement frame 14 includes the strip 18 which is the left part of the image 16 of the original frame 12. The replacement frame 15 includes the strip 19 which is the right part of the image 16 of the original frame 12.

During projection of the movie, each replacement frame 14, 15 is typically projected one at a time, preferably one after another. It will be appreciated that the number of new created frames for each original frame affects the rate of the projection. In the example of FIG. 1, the projection frame rate needs to be doubled, so that now the movie is projected at 48 frames per second instead of 24 frames per second.

As a consequence, the human viewer typically does not perceive any difference in the movie, which will be seen as fluid as usual. However, the camcorder will record the movie with substantial degradation, so that an illegal copy will be a very low quality copy, and therefore practically unusable.

It will be appreciated that the desired projection frame rate will at least partially determine the number of divisions of each original frame.

It will also be appreciated by those ordinarily skilled in the art that the number of divisions of each original frame does not have to be fixed and can be changed for every movie or even within the same movie, in order to counter piracy.

In the example of FIG. 1, the frame is divided equally in half. Other examples are now described below where frames are not divided equally in half.

Figure 2:
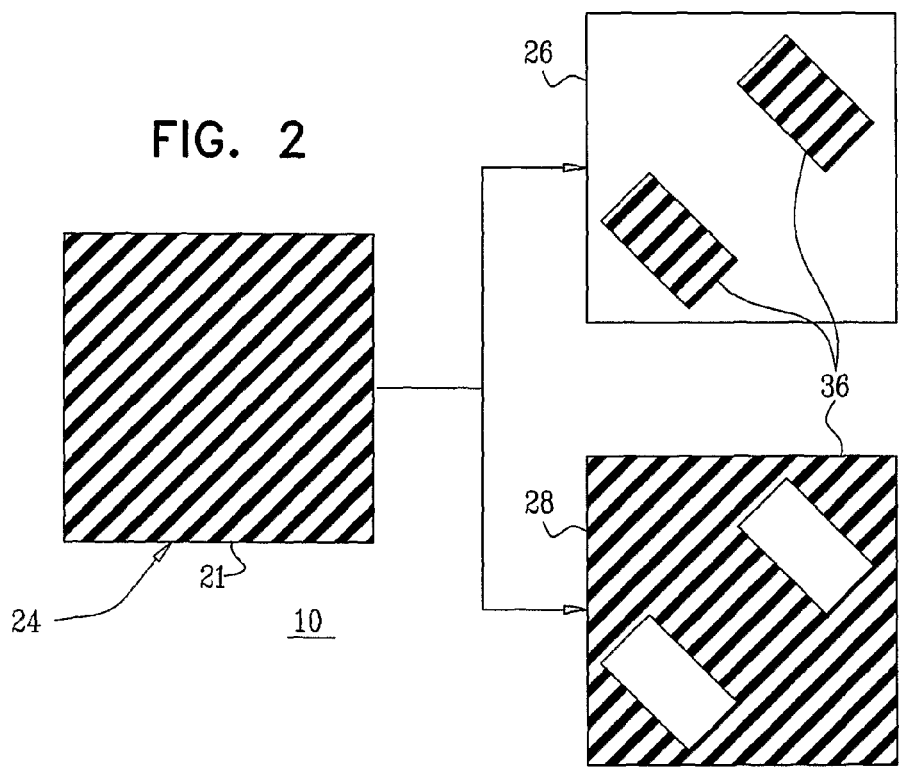
FIG. 2 is a simplified pictorial illustration of asymmetric frame division in the system of FIG. 1.

Reference is now made to FIG. 2, which is a simplified pictorial illustration of asymmetric frame division in the system 10 of FIG. 1. An original frame 21 has an image 24. The image 24 of the original frame 21 is preferably divided into a plurality of different regions 36 for disposing among a replacement frame 26 and a replacement frame 28 so that the image 24 is divided asymmetrically between the replacement frame 26 and the replacement frame 28.

Figure 3:
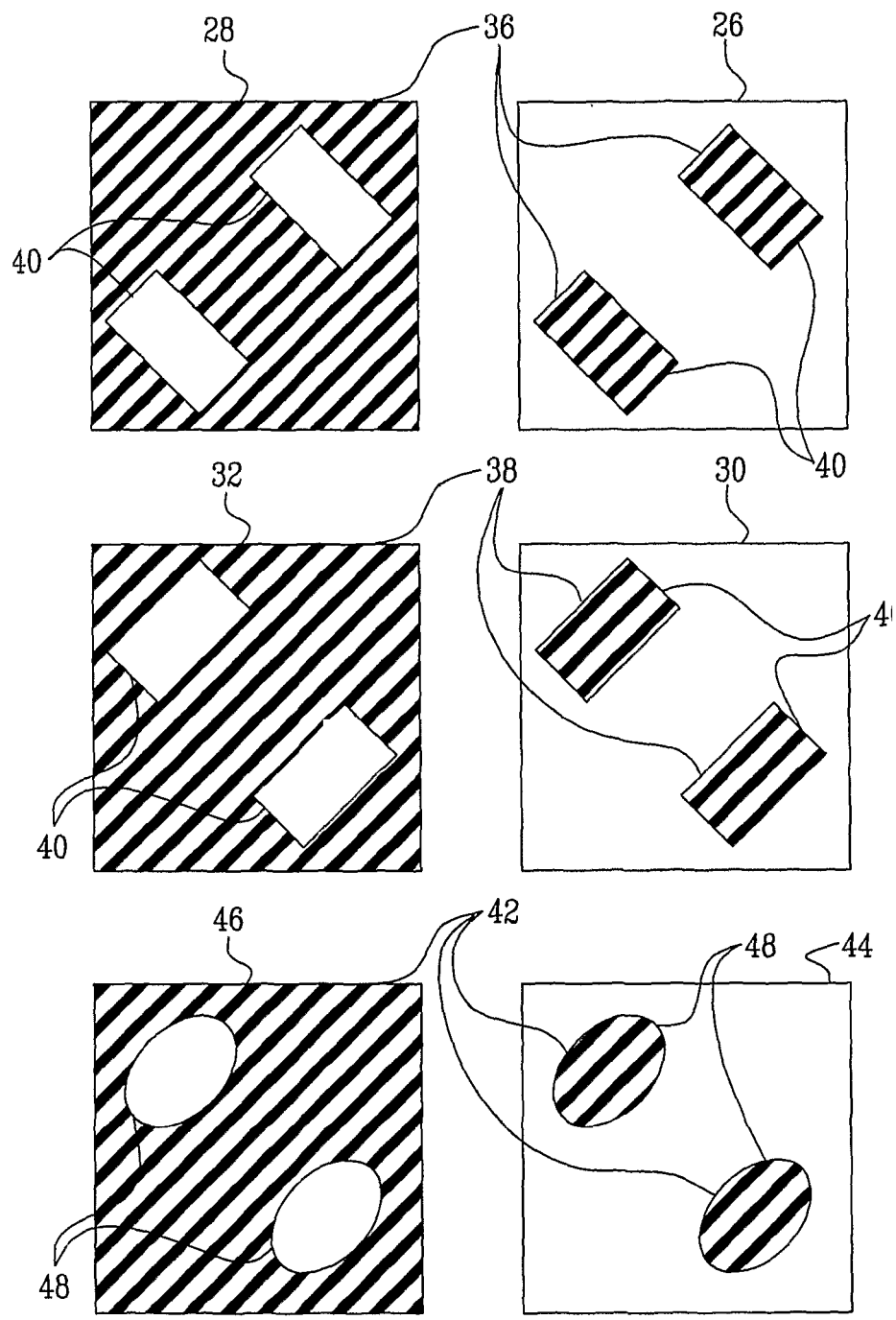
FIG. 3 is a simplified pictorial illustration of alternative frame division in the system of FIG. 1.

Reference is now made to FIG. 3, which is a simplified pictorial illustration of alternative frame division in the system 10 of FIG. 1. The form of the division of the original frames in to two or more replacement-frames is optionally different for different original frames within the same movie, as is now described below.

The results of the division of the image 24 of the original frame 21 of FIG. 2 into the different regions 36 using the replacement frame 26 and the replacement frame 28 is shown again in FIG. 3.

Another original frame (not shown), in the same movie as the original frame 21, is divided into a plurality of different regions 38 among a replacement frame 30 and a replacement frame 32. The different regions 38 have the same shape as the different regions 36. However, the different regions 38 are in a different orientation than the orientation of the different regions 36. The different regions 38 are based on the same two shapes 40 (two rectangles) as the different regions 36. However, the shapes 40 of the different regions 38 of the replacement frame 30 are in a different location and orientation than the shapes 40 of the different regions 36 of the replacement frame 26.

Yet another original frame (not shown), in the same movie as the original frame 21, is divided into a plurality of different regions 42 among a replacement frame 44 and a replacement frame 46. The different regions 42 have two shapes 48 (ovals). The shapes 48 (ovals) are different than the shapes 40 (rectangles) of the different regions 36, 38.

The frame division system 10 described above with reference to FIGS. 1-3 is typically implemented using the methods described with reference to FIGS. 4-7.

Figure 4:
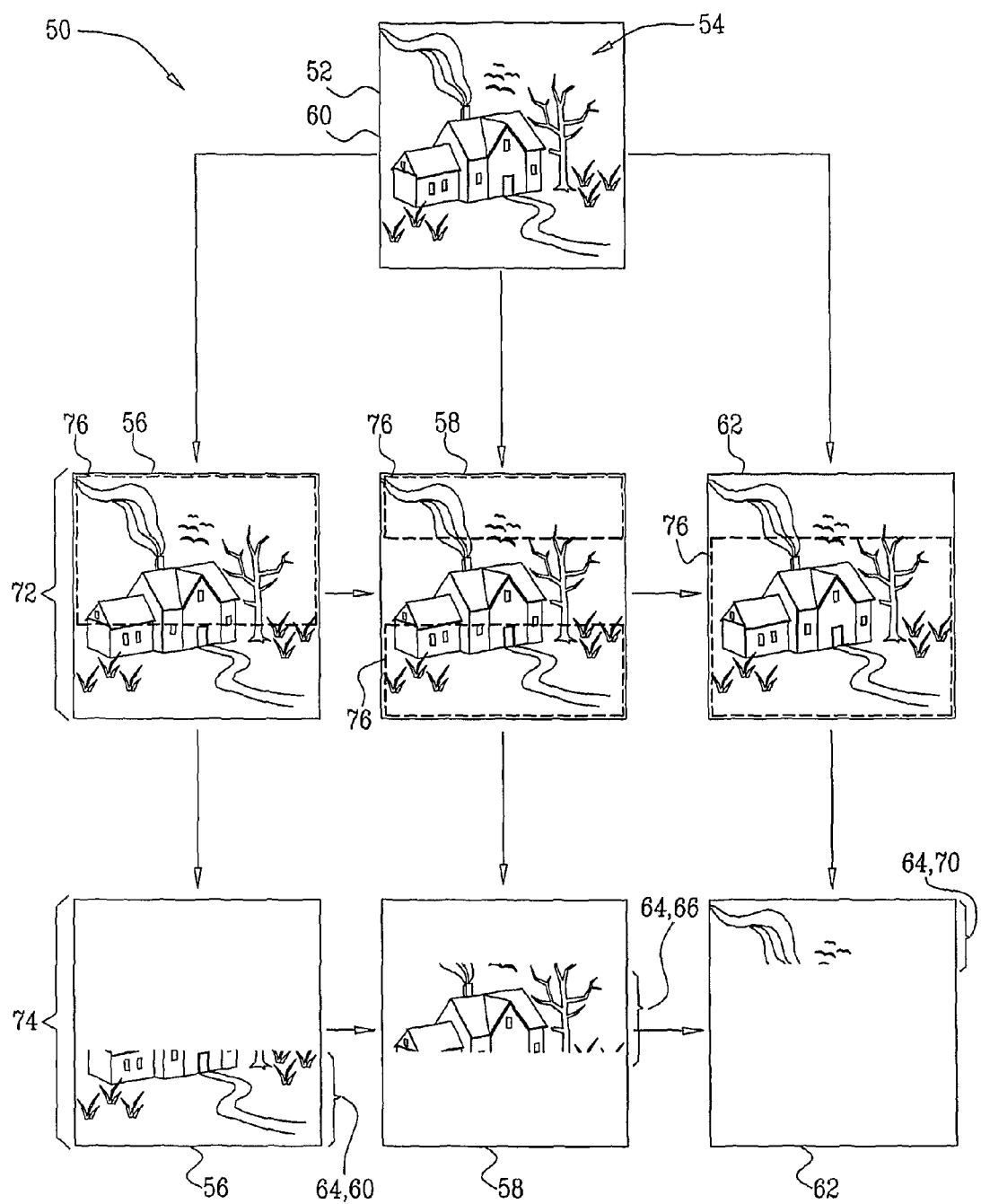
FIG. 4 is a simplified pictorial illustration showing a preferred method of preparing a movie for use with the system of FIG. 1.

Reference is now made to FIG. 4, which is a simplified pictorial illustration showing a preferred method of preparing a movie 50 for use with the system 10 of FIG. 1. The movie 50 preferably includes a plurality of filmed frames 52 (only one filmed frame 60 is shown for the sake of clarity). Each of the filmed frames 52 typically includes an image 54. The movie is preferably prepared performing the following steps, described by way of example for the filmed frame 60. The steps are repeated for each of the filmed frames 52 of the movie 50.

First, the filmed frame 60 is preferably physically duplicated yielding a projected frame 56, a projected frame 58 and a projected frame 62 (bracket 72). The first step is typically performed for all of the filmed frames 52 of the movie 50 before the next step is performed. Dotted lines show a plurality of regions 76 which are removed from the projected frames 56, 58, 62 in the next step of editing.

Second, the movie 50 is edited, prior to projection, such that different regions 64 of the image 54 of the filmed frame 60 are in the different frames 56, 58, 62 (bracket 74). The regions 64 include a region 66, a region 68 and a region 70. The different regions 66, 68, 70 are preferably non-intersecting regions of the image 54 of the filmed frame 60. The projected frame 56 includes the region 66. The projected frame 58 includes the region 68. The projected frame 62 includes the region 70. Therefore, the different regions 66, 68, 70 will be projected at different times, typically one after another, in the final movie 50. The editing preferably includes editing out the regions 76 in each of the projected frames 56, 58, 62 leaving behind the different regions 66, 68, 70.

Figure 5:
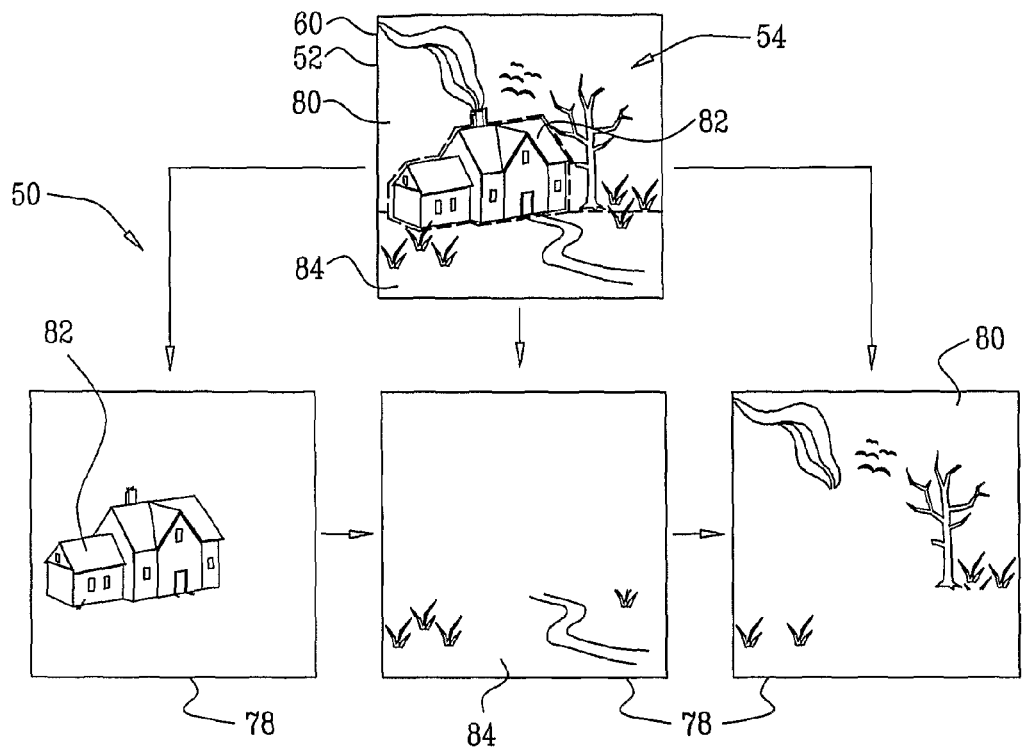
FIG. 5 is a simplified pictorial illustration showing another preferred method of preparing a movie for use with the system of FIG. 1.

Reference is now made to FIG. 5, which is a simplified pictorial illustration showing another preferred method of preparing the movie 50 for use with the system 10 of FIG. 1. In more progressive editing processes, which use digital editing, for example, the frame division of the movie 50 is preferably performed by using a module that analyzes the image 54 in each filmed frame 52, and finds the most suitable way to break each filmed frame 52 into two or more replacement frames 78 with parts of each replacement frame concealed as necessary. So for example, the image 54 of the filmed frame 60 is analyzed in order to decide a most suitable way to divide up the image 54 of the filmed frame 60 thereby determining a plurality of different regions 80, 82, 84. Each of the different regions 80, 82, 84 is disposed in a different one of the replacement frames 78 so that when the movie 50 is projected, the different regions 80, 82, 84 are projected at different times, preferably one after the other.

Figure 6:
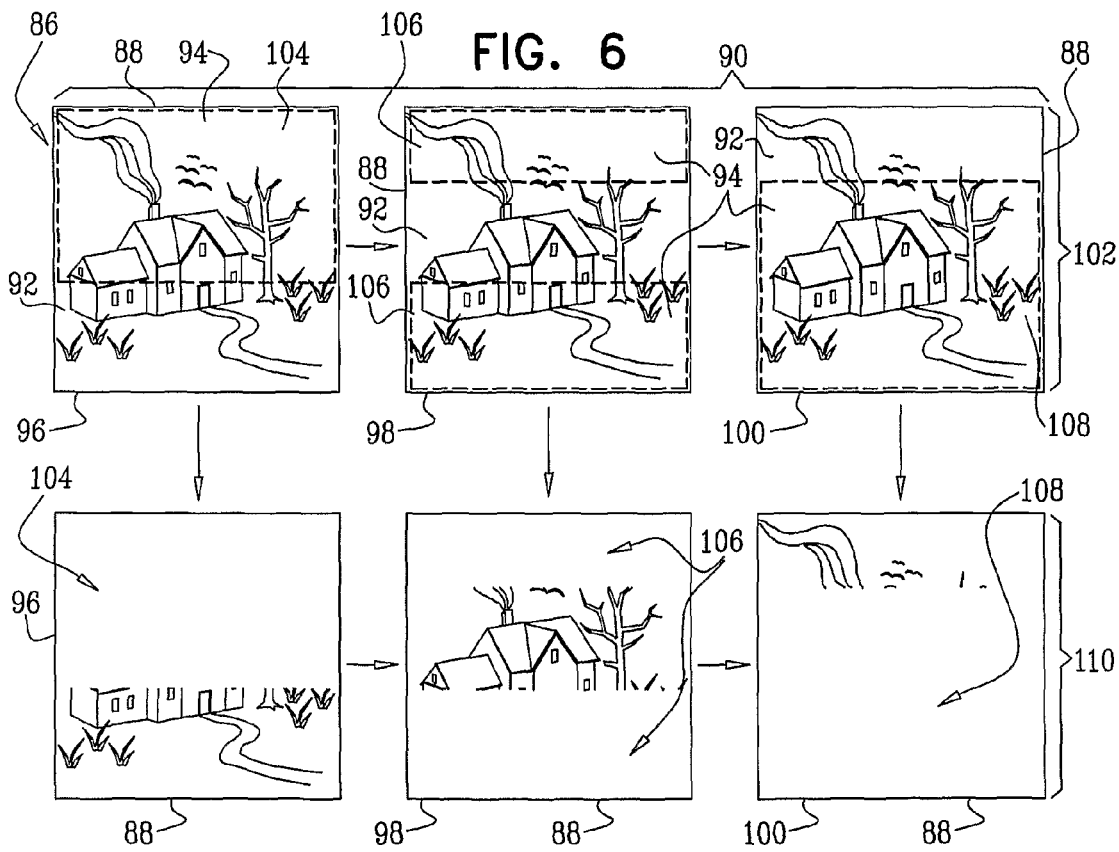
FIG. 6 is a simplified pictorial illustration showing yet another preferred method of preparing a movie for use with the system of FIG. 1.

Reference is now made to FIG. 6, which is a simplified pictorial illustration showing yet another preferred method of preparing a movie 86 for use with the system 10 of FIG. 1. When the movie 86 is filmed, the movie 86 is filmed at two or more times the normal filming speed yielding a plurality of groups 90 (at least pairs) of frames 88 having substantially the same image 92. Then an appropriate region or regions 94 of each frame 88 is edited out. The method is described in more detail below.

The movie 86 includes a sequence of the frames 88. By way of example, the movie 86 is shot at three times normal filming speed, so for substantially the same image 92 there are three frames 88, namely a frame 96, a frame 98 and a frame 100 (bracket 102). The frames 96, 98, 100 are adjacent to each other in the sequence of the frames 88. The regions 94 for removal are shown by a dotted line. In particular, the regions 94 include a region 104 of the frame 96, two regions 106 of the frame 98 and a region 108 of the frame 100. The regions 104, 106, 108 typically cover different regions of the image 92 of the frames 96, 98, 100.

Next, projection of the region 104 of the frame 96, the regions 106 of the frame 98 and the region 108 of the frame 100 is prevented by physically editing out the region 104 from the frame 96, the regions 106 from the frame 98 and the region 108 from the frame 100 prior to projection of the movie 86 (bracket 110). The editing is preferably repeated for each of the groups 90 (at least adjacent pairs) of the frames 88 of the movie 86.

Figure 7:
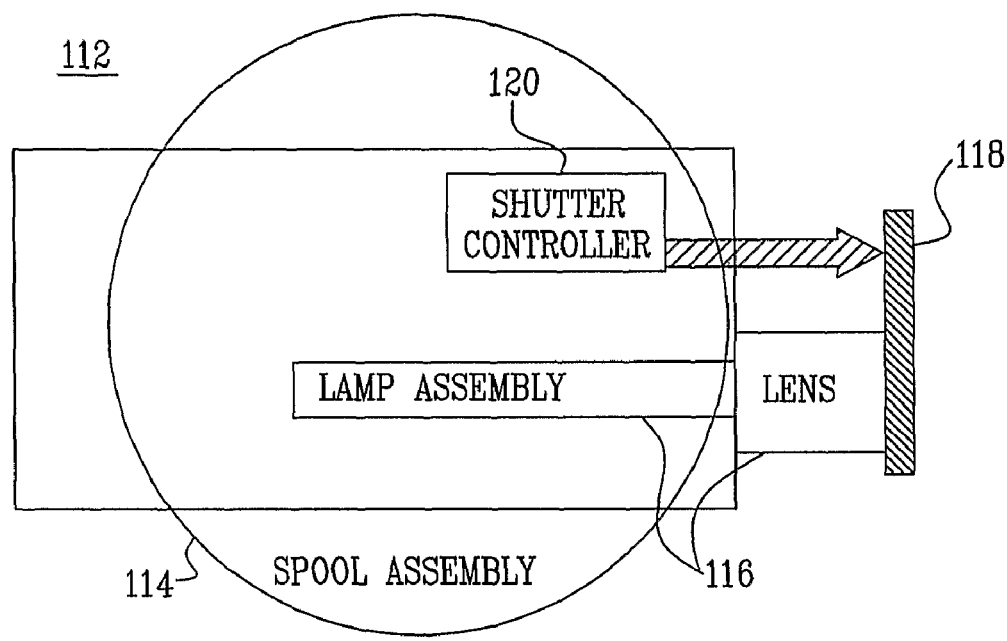
FIG. 7 is a simplified block diagram view of movie projector system for use with the anti-piracy system of FIG. 1.

Reference is now made to FIG. 7, which is a simplified block diagram view of a movie projector system 112 for use with the anti-piracy system 10 of FIG. 1. Instead of physically editing out regions of the movie 86 of FIG. 6, the regions 94 of the frames 96, 98, 100 are typically prevented from being projected during projection of the movie 86, as described below in more detail. Reference is also made to the bracket 102 of FIG. 6.

The movie projector system 112 preferably includes: a spool assembly 114 typically to spool the movie 86; a lamp and lens assembly 116 generally mechanically connected to the spool assembly 114; a shutter 118 typically mechanically connected to the lamp and lens assembly 116, the shutter 118 preferably being operative to prevent projection of at least one region 94 of at least one of the frames 88; and a shutter controller 120 typically operationally connected to the shutter 118. The shutter controller 120 is preferably operative to control the shutter 118 such that projection of the region 104 of the frame 96, the regions 106 of the frame 98 and the region 108 of the frame 100 is prevented.

The shutter controller 120 is preferably operative to control the shutter 118 such that a shape and/or location and/or orientation of the regions 94 changes between at least some of the groups 90 (at least pairs) of the frames 88.

It will be appreciated that the choice of how many times normal speed to film a movie will depend on the choice, and in particular speed, of the shutter 118, and vice versa.

Figure 8:
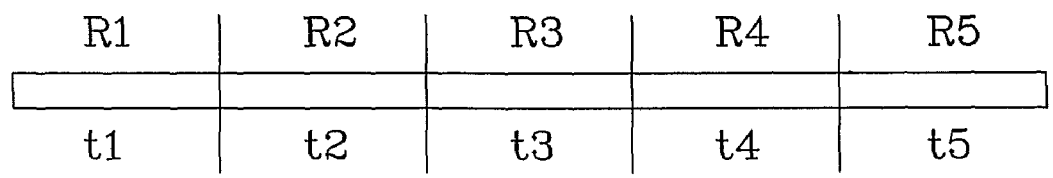
FIG. 8 is a simplified pictorial illustration of a fixed time interval changing projection rate for use in an anti-piracy system constructed and operative in accordance with an alternative preferred embodiment of the present invention.

Reference is now made to FIG. 8, which is a simplified pictorial illustration of a fixed time interval changing projection rate for use in an anti-piracy system 122 constructed and operative in accordance with an alternative preferred embodiment of the present invention.

As described above, a movie is composed of frames such that when the frames are projected at a constant rate of typically 24 frames per second (fps), a fluid motion is typically perceived by a viewer during projection of the movie.

By way of introduction, an attempt by a pirate to capture a movie being shown on a television (TV) screen, which has a refresh rate of 52.7 Hz, with a camcorder, generally results in a degraded image being captured by the camcorder. A well-known solution is to change the refresh rate of the camcorder to be substantially the same as the refresh rate of the TV screen. The refresh rate of the camcorder is typically adjusted by adjusting the shutter speed of the camcorder so that the camcorder is synchronized with the TV.

In order to frustrate pirating a movie, the system 122 preferably includes changing the projection rate, R, of the movie during the movie projection, so that the camcorder generally cannot synchronize with the movie projection rate, even if an automatic mechanism is provided in the camcorder to perform the synchronization.

Therefore, the system 122 preferably projects the movie with varying projection rates, R, throughout the projection of the movie typically at fixed time intervals, t. Therefore, at the end of each time interval, t, the projection rate, R, is typically changed. All of the time intervals, t, preferably have the same duration. In FIG. 8 five time periods are shown (t1 to t5) having corresponding projection rates (R1 to R5).

A projector (not shown) of the system 122 needs to be instructed how to project the movie as required by the projection rate, R, for each time interval, t. The projector is typically instructed regarding the projection rates using a control track, or in any other suitable method that enables synchronization between the projector and the required projection rate, R, for each time interval, t.

Figure 9:
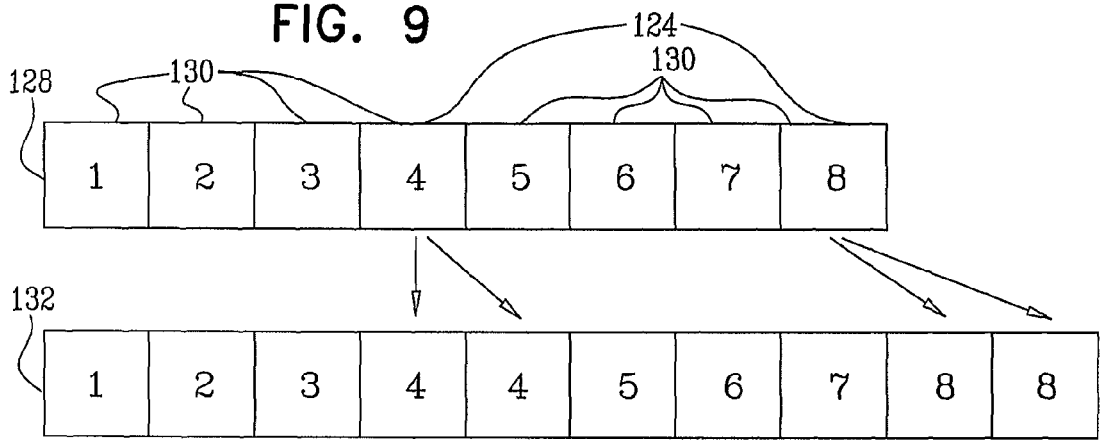
FIG. 9 is a simplified pictorial illustration of duplicating frames for use with the system of FIG. 8.
Figure 10:
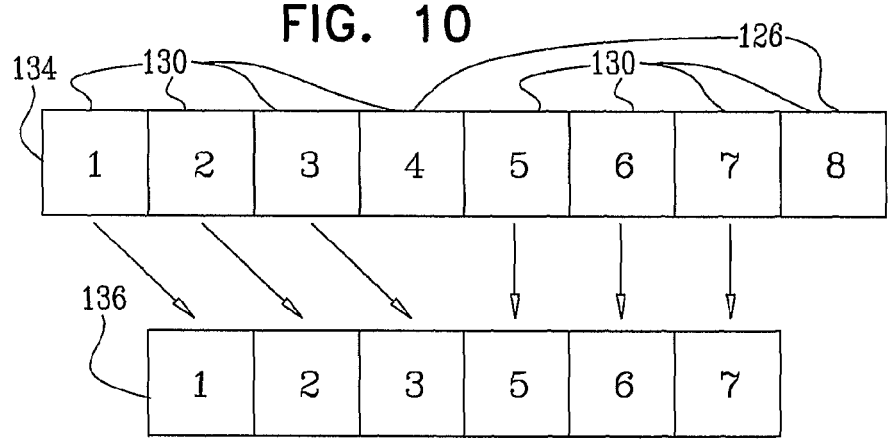
FIG. 10 is a simplified pictorial illustration of removing frames for use with the system of FIG. 8.

Reference is now made to FIG. 9, which is a simplified pictorial illustration of duplicating a plurality of frames 124 for use with the system 122 of FIG. 8. Reference is also now made to FIG. 10 is a simplified pictorial illustration of removing a plurality of frames 126 for use with the system 122 of FIG. 8. Reference is also made to FIG. 8. It is important to note that for each time interval, t, projected at projection rate, R (each time interval, t, corresponding to different sections of the movie), one or more original frames of the movie typically need to be duplicated or removed at the movie editing stage so that the movie will be perceived by the viewer as being projected at a constant rate.

By way of example only (as shown in FIG. 9), a first section 128 of the movie includes a sequence of eight frames 130 to be projected at a faster rate, R1, than the rate at which the movie was filmed. Therefore, the frames 124 (frames 4 and 8) of the first section 128 are duplicated yielding a sequence 132 of ten frames 130, so that the first section 128 can be projected at the projection rate, R1.

Also, by way of example only (as shown in FIG. 10), a second section 134 of the movie includes a sequence of 8 frames 130 to be projected at a slower rate, R2, than the rate at which the movie was filmed. Therefore, the frames 126 (frames 4 and 8) of the second section 134 are removed yielding a sequence 136 of six frames 130, so that the second section 134 can be projected at the projection rate, R2. Projection rate R1 is different from the projection rate R2.

Therefore, the projection of the first section 128 at the projection rate, R1, and the projection of the second section 134 at the projection rate, R2, is perceived by the viewer as being projected at a constant rate.

The duration of the projection of the first section 128 at the projection rate, R1, is substantially the same (within frame accuracy) as the duration of the projection of the second section 134 at the projection rate, R2.

Figure 11:
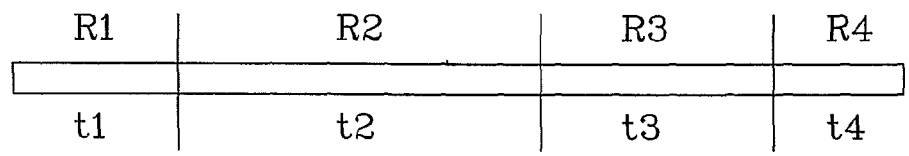
FIG. 11 is a simplified pictorial illustration of a non-fixed time interval changing projection rate for use with the system of FIG. 8.

Reference is now made to FIG. 11, which is a simplified pictorial illustration of a non-fixed time interval changing projection rate for use with the system 122 of FIG. 8. Optionally, the duration of the time intervals t is preferably varied as shown in FIG. 11. By way of example, the duration of the projection of the section of time interval t1, projected at the projection rate R1, is different to the duration of the projection of the section of time interval t2, projected at the projection rate R2.

Figure 12:
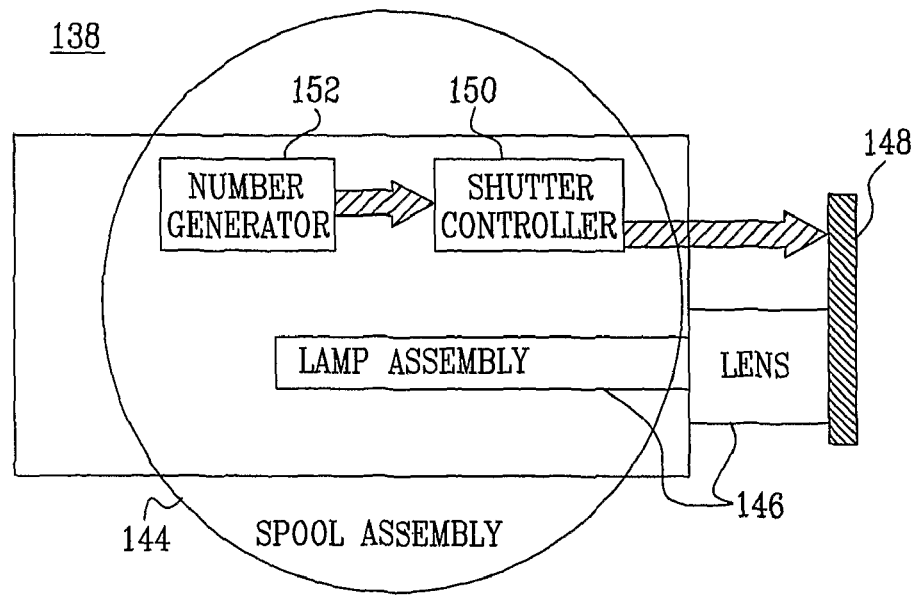
FIG. 12 is a simplified block diagram view of a movie projector system constructed and operative in accordance with a preferred embodiment of the present invention.
Figure 13:
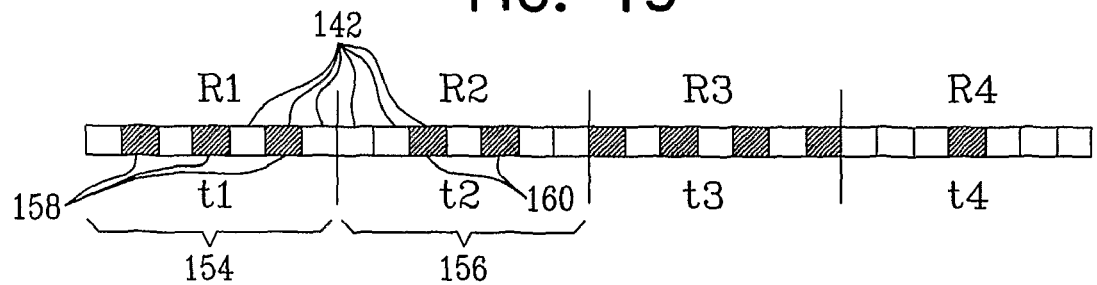
FIG. 13 is a simplified pictorial illustration of a fixed time interval changing projection rate for use with the system of FIG. 12.

Reference is now made to FIG. 12, which is a simplified block diagram view of a movie projector system 138 constructed and operative in accordance with a preferred embodiment of the present invention. Reference is also now made to FIG. 13, which is a simplified pictorial illustration of a fixed time interval changing projection rate for use with the system 138 of FIG. 12.

The movie projector system 138 preferably projects a movie 140 filmed at a relatively high rate, for example, but not limited to, between 4 and 10 times faster than movies are normally filmed. One reason for filming the movie 140 at a higher rate than normal is to allow the movie projector system 138 to exclude selected frames of the filmed movie 140 from being projected, as will be described below in more detail.

The movie projector system 138 is now described in more detail.

The movie projector system 138 is for frustrating piracy of the movie 140 including a sequence of a plurality of frames 142 (only six frames 142 are labeled in FIG. 13 for the sake of clarity). The movie projector system 138 preferably includes: a spool assembly 144 typically to spool the movie 140; a lamp and lens assembly 146 generally mechanically connected to the spool assembly 144; a shutter 148 typically mechanically connected to the lamp and lens assembly 146, the shutter 148 preferably being operative to selectively exclude individual ones of the frames 142 from being projected; a shutter controller 150 typically operationally connected to the shutter 148; and a number generator 152 generally operationally connected to the shutter controller 150. The number generator 152 typically generates numbers, preferably randomly (pseudo-randomly or real-random) in order to instruct the shutter controller 150 how many frames 142 to exclude from projection in each time period, t.

The operation of the shutter controller 150 is now described with reference to two sections 154, 156 of the movie 140.

The shutter controller 150 is preferably operative to control the shutter 148 such that: a first number of the frames 142 (for example, a plurality of frames 158) of the section 154 (time period t1) of the movie 140 are excluded from projection; and a second number of the frames 142 (for example, a plurality of frames 160) of the section 156 (time period t2) of the movie 140 are excluded from projection. The first number is generally not equal to the second number. The shaded frames in FIG. 13 indicate frames 140 excluded from projection by the shutter 148.

Therefore, the "projected to the screen" frame rate of the section 154 (R1) is typically different to the "projected to the screen" frame rate of the section 156 (R2). The duration of the projection of the section 154 (time period t1) and the section 156 (time period t2) as well as all the sections of the movie 140 are typically the same.

The frames 142 excluded in each time interval, t, are preferably randomly spread over the available frames of the time interval.

The viewer of the movie 140 in the movie theater still perceives fluid motion, since the number of remaining frames is sufficient for fluid motion perception. However, a pirated video copy by a camcorder will generally be of a poor quality as the camcorder will have problems synchronizing throughout the projection of the movie 140.

It should be noted that the actual projection frame rate (the speed of the projection of the movie 140 by the spool assembly 144) is preferably the same as the rate at which the movie 140 was filmed. However, some of the filmed frames 142 are generally not projected leading to changing the "projected to the screen" frame rate throughout projection of the movie 140.

Figure 14:
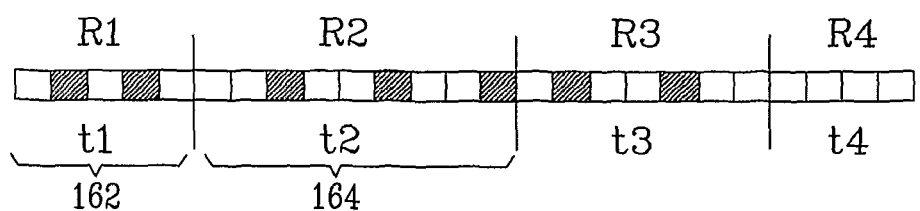
FIG. 14 is a simplified pictorial illustration of a non-fixed time interval changing projection rate for use with the system of FIG. 12.

Reference is now made to FIG. 14, which is a simplified pictorial illustration of a non-fixed time interval changing projection rate for use with the movie projector system 138 of FIG. 12. Optionally, the duration of the time intervals t is varied as shown in FIG. 14. By way of example, the duration of the projection of a section 162 (time interval t1), with a "projected to the screen" rate, R1, is different to the duration of the projection of a section 164 (time interval t2), with a "projected to the screen" rate, R2.

Figure 15:
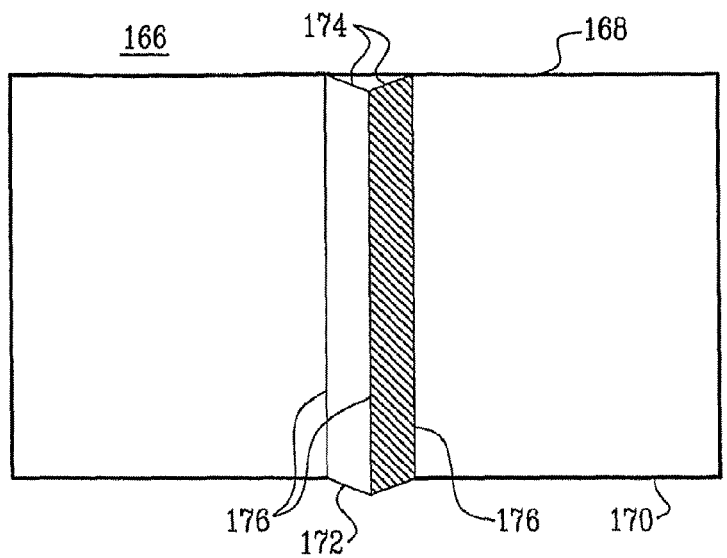
FIG. 15 is a schematic orthogonal view of a movie screen apparatus constructed and operative in accordance with a preferred embodiment of the present invention.
Figure 16:
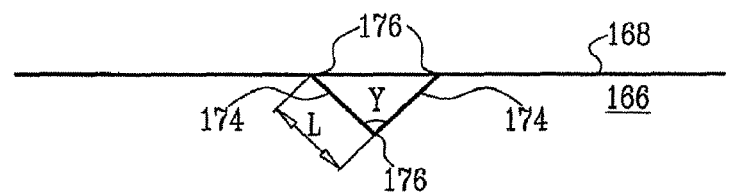
FIG. 16 is a schematic top view of the apparatus of FIG. 15.

Reference is now made to FIGS. 15 and 16. FIG. 15 is a schematic orthogonal view of a movie screen apparatus 166 constructed and operative in accordance with a preferred embodiment of the present invention. FIG. 16 is a schematic top view of the apparatus 166 of FIG. 15.

The movie screen apparatus 166 preferably includes: a projection surface 168 having a plurality of edges 170; and an anti-piracy surface feature 172 typically disposed on the projection surface 168. The surface feature 172 preferably includes two strips 174. Each of the strips 174 generally includes two edges 176 extending from one of the edges 170 of the projection surface 168 to another of the edges 170 of the projection surface 168. One of the edges 176 of the strips 174 is typically connected to the projection surface 168 and another of the edges 176 of the strips 174 preferably connecting the strips 174 together. A minimum angle, Y, between the strips 174 is typically greater than 90 degrees and less than 180 degrees. Each strip 174 generally has a minimum width, L, of 0.5 cm.

The surface feature 172 generally causes the center of an image recorded by a pirate camcorder to be degraded due to uneven reflections from the surface feature 172. The pirate camcorder therefore typically films images with a darker or lighter patch corresponding to the surface feature 172 so that the pirated copy is practically useless. However, the human eye typically adapts easily to the different light reflections.

It will be appreciated by those ordinarily skilled in the art that the projection surface 168 and the strips 174 may be formed as separate elements or as a single unitary item.

Figure 17:
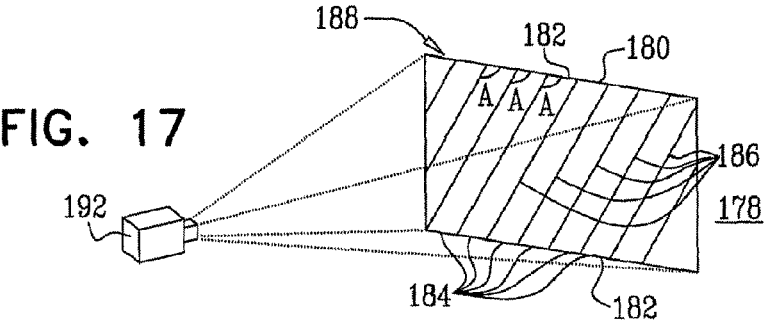
FIG. 17 is a schematic orthogonal view of a movie screen apparatus constructed and operative in accordance with an alternative preferred embodiment of the present invention.
Figure 18:
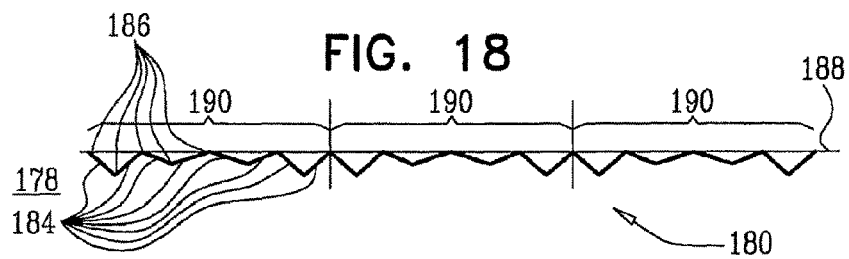
FIG. 18 is a schematic top view of the movie screen apparatus of FIG. 17.
Figure 19:
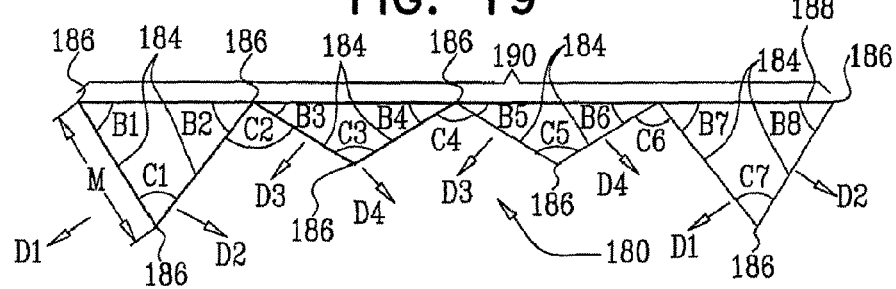
FIG. 19 is an expanded view of a section of FIG. 18.

Reference is now made to FIGS. 17-19. FIG. 17 is a schematic orthogonal view of a movie screen apparatus 178 constructed and operative in accordance with an alternative preferred embodiment of the present invention. FIG. 18 is a schematic top view of the movie screen apparatus 178 of FIG. 17. FIG. 19 is an expanded view of a section of FIG. 18.

The movie screen apparatus 178 preferably includes a projection surface 180 typically having a plurality of edges 182 (top and bottom edge of the projection surface 180). The projecting surface 180 preferably includes a plurality of strips 184. Each of the strips 184 typically includes two edges 186 (along the elongated direction of the strips 184). The edges 186 of the strips 184 generally extend from one edge 182 of the projection surface 180 to another edge 182 of the projection surface 180. The strips 184 are preferably connected to each other at the edges 186 of the strips 184. The strips 184 are typically mounted on a screen backing 188 to provide extra support for the structure of the strips 184. The edges 186 (along the elongated direction) of each strip 184 makes any suitable angle, A, with the top edge 182 of the projection surface 180, as shown in FIG. 17.

The strips 184 are generally arranged in a plurality of groups 190. Each of the groups 190 typically forms a pattern. The same pattern preferably repeats for each of the groups 190. However, it will be appreciated by those ordinarily skilled in the art that the movie screen apparatus 178 may include a single group of strips with no repeating pattern.

FIG. 18 shows an expanded view of one group 190. The different strips in each group 190 face in at least four different directions (D1, D2, D3 and D4).

A minimum angle between the strips 184 (for example, angle C1, C2, C3, C4, C5, C6 or C7) is greater than 90 degrees and less than 180 degrees. Therefore, the minimum angle subtended between the strips 184 and the screen backing 188 (for example, angle B1, B2, B3, B4, B5, B6, B7, B8) is typically greater than 0 degrees and typically less than 90 degrees, preferably less than 45 degrees. The strips typically have a minimum width, M, of 0.5 cm. All the strips may have the same width, M, or different widths or any other suitable choice of widths. For example, two adjacent strips may have different widths, so that the angle subtended between the adjacent strips and the screen backing 188 is different for each of the adjacent strips.

In the example of FIG. 18, angles C1 and C7 are the same, angles C3 and C5 are the same, angles B1, B2, B7 and B8 are the same and angles B3, B4, B5 and B6 are the same. However, each of the minimum angles between the strips 184 or between the screen backing 188 and the strips 184 may be different or any other suitable choice of angles.

The projections and depressions created by the strips 184 generally causes an image recorded by a pirate camcorder to be degraded due to uneven reflections from the strips 184. The pirate camcorder therefore generally films images with a darker or lighter patch corresponding to the projections and depressions so that the pirated copy is practically useless. However, the human eye typically adapts easily to the different light reflections.

It will be appreciated by those ordinarily skilled in the art that the strips 184 can be any suitable shape and have any suitable form, for example, but not limited to, a flat form or a curved form.

In accordance with a preferred embodiment of the present invention, movies are projected by one projector 192 (FIG. 17) onto the movie screen apparatus 178. Therefore, no change is required in standard movie theaters in the projector room.

In accordance with other preferred embodiments of the present invention, movies are projected by a plurality of synchronized projectors, or optical arrangements, onto the screen. The number of projectors used is typically equal to the number of different directions, D that the strips 184 face. The projectors typically project alternately, one at a time, each projector being adapted to project in each of the directions, D. Optionally, the projectors project at the same time such that there is preferably no overlapping of the image on the screen as described with reference to FIGS. 23 and 24. Projection systems for projecting onto a multi-directional screen are described in more detail with reference to FIGS. 21-24.

It will be appreciated by those ordinarily skilled in the art that the screen backing 188 and the strips 184 may be formed from separate elements or as a unitary item.

Figure 20:
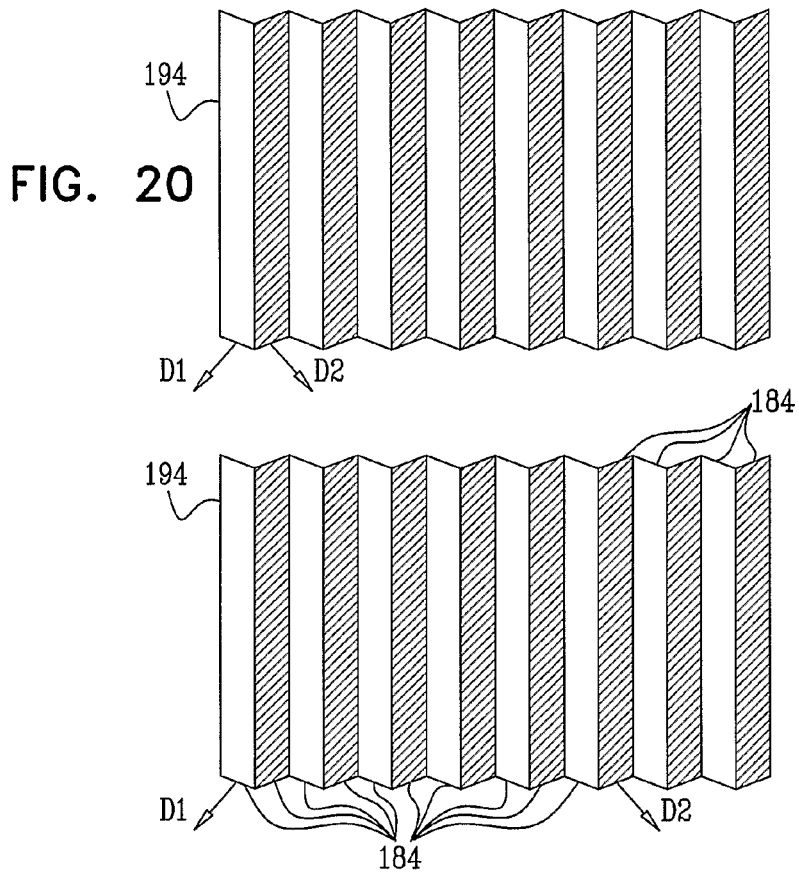
FIG. 20 is a schematic orthogonal view of a movie screen apparatus constructed and operative in accordance with another alternative preferred embodiment of the present invention.

Reference is now made to FIG. 20, which is a schematic orthogonal view of a movie screen apparatus 194 constructed and operative in accordance with another alternative preferred embodiment of the present invention. In order to simplify the description of the projection systems of FIGS. 21-24, the projection systems are described with reference to the movie screen apparatus 194 which is a two-directional movie screen. However, it will be appreciated by those ordinarily skilled in the art that the projection systems of FIGS. 21-24 may be implemented with a projection screen having strips facing more than two directions.

The movie screen apparatus 194 is described in more detail below.

The movie screen apparatus 194 is substantially the same as the movie screen apparatus 178 (FIGS. 17-19) except that in the movie screen apparatus 194 all the strips 184 have the same width and all the strips subtend the same angle with each other and the screen backing 188 so that all the strips 184 face one of two directions, D1 or D2.

Figure 21:
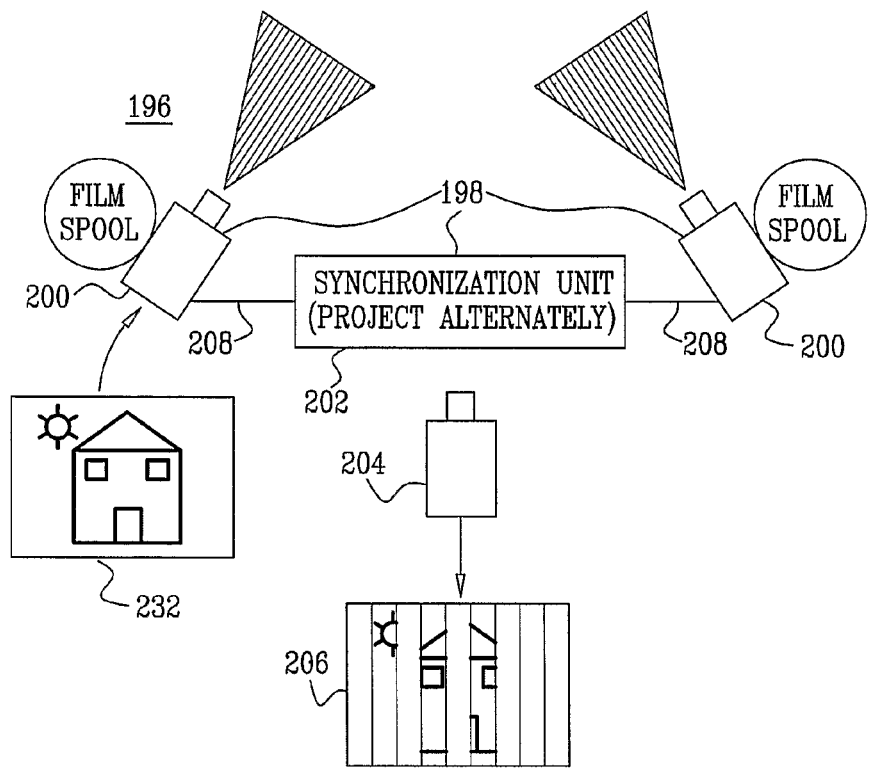
FIG. 21 is a partly pictorial, partly block diagram view of a multi-projector anti-piracy system constructed and operative in accordance with a preferred embodiment of the present invention for use with the movie screen apparatus of FIG. 20.

Reference is now made to FIG. 21, which is a partly pictorial, partly block diagram view of a multi-projector anti-piracy system 196 constructed and operative in accordance with a preferred embodiment of the present invention for use with the movie screen apparatus of FIG. 20. It will be appreciated by those ordinarily skilled in the art that the anti-piracy system 196 may be used with other suitable movie screens with suitable modification to the anti-piracy system 196.

The anti-piracy system 196 preferably includes a synchronized projector arrangement 198. The projector arrangement 198 typically includes a plurality of synchronized projectors 200. Each of the projectors 200 is generally associated with one of the different directions, D1 and D2, typically by arranging the projectors 200 so as to project a movie from different orientations relative to the screen 194 on to the strips 184 facing the different directions, D1 and D2. The projector arrangement 198 also preferably includes a synchronization unit 202 to synchronize the projectors 200 so as to selectively project alternately in each one of the different directions, D1 and D2. The synchronization unit 202 is preferably operationally connected to the projectors 200 either by a wired connection 208 or a wireless connection (not shown).

Therefore, one projector 200 typically projects onto the strips 184 facing the direction D1 and the other projector 200 typically projects onto the strips 184 facing the direction D2, alternately. Each projector 200 generally projects complete frames 232 (only one shown) of the whole movie in the manner described below.

By way of example only, one projector 200 starts projecting on the strips 184 facing the direction D1 every other ⅟₄₈ second (in other words, the first ⅟₄₈ second, the third ⅟₄₈ second, and so on) and the other projector 200 then projects on the strips 184 facing the direction D2 every other ⅟₄₈ second (in order words, the second ⅟₄₈ sec, the forth ⅟₄₈, and so on).

It should be noted that projection every ⅟₄₈ of a second by each projector 200 is just given by way of example only. The projection rate may be as low as every ⅟₃₂ of a second per frame in order for the human eye to perceive fluid movement and typically less than ⅟₆₄ of a second so that a pirate camcorder 204 does not record more than 32 complete frames per second.

Therefore, the human eye perceives a fluid effect, while a camcorder copy is practically unusable, because even if the projection frame rate is sufficient for fluid movement, only parts of each frame are projected at any one moment for capturing by the camcorder 204, as shown by a sample frame 206 captured by the camcorder 204.

It will be appreciated by those ordinarily skilled in the art that more than two projectors may be used depending on the screen being used. Additionally, it will be appreciated by those ordinarily skilled in the art that the projection timing will also depend on the number of projectors used.

Figure 22:
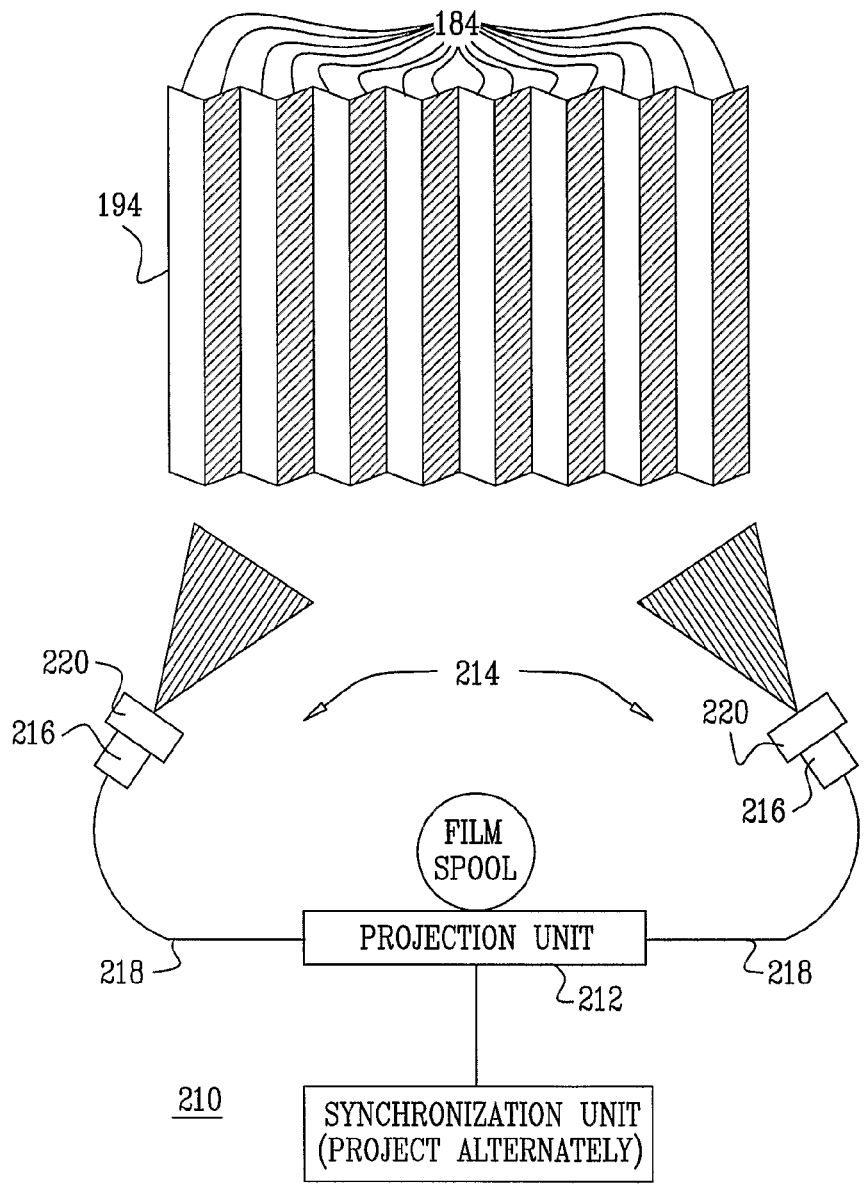
FIG. 22 is a partly pictorial, partly block diagram view of a single projector anti-piracy system constructed and operative in accordance with a preferred embodiment of the present invention for use with the movie screen apparatus of FIG. 20.

Reference is now made to FIG. 22, which is a partly pictorial, partly block diagram view of a single projector anti-piracy system 210 constructed and operative in accordance with a preferred embodiment of the present invention for use with the movie screen apparatus 194 of FIG. 20. The anti-piracy system 210 is substantially the same as the anti-piracy system 196 of FIG. 21 except for the following differences. The projectors 200 are preferably replaced by a single projector 212 to simulate the action of the projectors 200 using an optical arrangement 214 typically including one or more of the following optical components: mirrors (not shown), prisms (not shown), lenses 216, beam splitters (not shown), waveguides 218 and shutters 220.

The optical arrangement 214 is adapted so that a beam projected from the projector 212 is consecutively projected in each of the available directions (for example, D1 and D2). Therefore, the frames of the original movie typically need to be duplicated for each direction (for example, D1 and D2). Alternatively, the movie needs to be filmed at a very high rate, typically equal to a standard shooting rate multiplied by the possible number of different directions (for example, D1 and D2) so that quality and/or fluid motion is not lost.

Moving from one projection direction (for example, D1 and D2) to another is typically performed by disposing the shutters 220 in the paths of the beams for each direction (for example, D1 and D2) and then selectively operating the shutters 220 so that only one of the paths allows light to pass to the movie screen apparatus 194 at any one time.

Reference is now made to FIG. 23, which is a partly pictorial, partly block diagram view of a multi-projector anti-piracy system 222 constructed and operative in accordance with an alternative preferred embodiment of the present invention for use with the movie screen apparatus 194 of FIG. 20. The anti-piracy system 210 is substantially the same as the anti-piracy system 196 of FIG. 21 except for the following differences. First, the synchronization unit 202 is operative to synchronize the projectors 200 to project from the different orientations on to the strips 184 simultaneously (both the projectors 200 projecting onto the movie screen apparatus 194 at the same time, and not alternately). Second, the projecting by the projectors 200 is preferably performed such that there is no overlap of the movie on the movie screen apparatus 194 from the different orientations. Overlap of the movie on the screen 194 is typically prevented by editing, for each of the projectors 200, a copy of the movie in order to remove non-projected parts of the copy. FIG. 23 shows a frame 224 which includes "odd" strips of an original frame (not shown) for projection by one projector 200 and a frame 226 which includes "even" strips of the original frame for projection by the other projector 200. However, the whole original frame is projected, in combination, by the two projectors 200.

The editing is preferably performed using one of the methods described with reference to FIGS. 4-6 or any other suitable editing method.

Therefore, a pirate camcorder records a copy of the movie which has: light and dark patches due to the different reflections from the non-uniform screen; or missing patches typically due to the position of the camcorder in the movie theater in relation to the strips 184 of the screen 194.

Reference is now made to FIG. 24, which is a partly pictorial, partly block diagram view of a multi-projector anti-piracy system 228 constructed and operative in accordance with another alternative preferred embodiment of the present invention for use with the movie screen apparatus 194 of FIG. 20. The anti-piracy system 228 is substantially the same as the anti-piracy system 222 of FIG. 23 except that overlap of the movie on the screen 194 is typically prevented using a plurality of complementary filters 230. One of the filters 230 is disposed over the lens of each projector 200. Therefore, selective projection of the movie is performed without editing the movie by using the complementary filters 230 on the projectors 200. Therefore, different parts of each frame of the movie are projected by the different projectors 200 without editing the movie.

It will be appreciated by those ordinarily skilled in the art that the projectors 200 may be replaced by a single projector such as the projector 212 (FIG. 22) using a suitable optical arrangement such as the optical arrangement 214 (FIG. 22) with suitable modifications.

Reference is now made to FIG. 25, which is a schematic top view of a movie screen apparatus 234 constructed and operative in accordance with another alternative preferred embodiment of the present invention. The movie screen apparatus 234 is substantially the same as the movie screen apparatus 178 described with reference to FIGS. 17-19 except for the following differences. The strips 184 are only connected to the screen backing 188 and not to each other so that the screen surface is non-continuous with gaps between the strips 184. The strips 184 are still arranged in the groups 190 facing at least two directions. In the example of FIG. 25, the strips 184 are facing in three directions, D5, D6, and D7.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A method for frustrating piracy of a movie, the movie including a plurality of filmed frames, each of the filmed frames including an image, the method comprising:

editing the movie prior to projection such that different regions of the image of one of the filmed frames are in different frames so that the different regions will be projected at different times; and repeating the editing for other ones of the filmed frames.

2. The method according to claim 1, wherein the different regions are non-intersecting regions of the image of the one filmed frame.

3. The method according to claim 1, further comprising physically duplicating the one filmed frame yielding a first projected frame and a second projected frame, the first projected frame including one of the different regions, the second projected frame including another of the different regions.

4. The method according to claim 3, wherein the editing includes editing out at least one region in each of the first projected frame and the second projected frame leaving behind the different regions.

5. The method according to claim 1, further comprising analyzing the image of the one filmed frame in order to decide a most suitable way to divide up the image of the one filmed frame thereby determining the different regions.

6. The method according to claim 1, wherein a shape of at least one of the different regions changes between the one filmed frame and another one of the filmed frames.

7. The method according to claim 1, wherein a location of at least one of the different regions changes between the one filmed frame and another one of the filmed frames.

8. The method according to claim 1, wherein an orientation of at least one of the different regions changes between the one filmed frame and another one of the filmed frames.

9. A tangible film medium including a movie edited by the method of claim 1.

* * * * *

UNITED STATES PATENT AND TRADEMARK OFFICE
CERTIFICATE OF CORRECTION

PATENT NO. : 7,907,248 B2  Page 1 of 1
APPLICATION NO. : 11/920900
DATED : March 15, 2011
INVENTOR(S) : Moshe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 550 days.

Signed and Sealed this
Twenty-eighth Day of August, 2012

David J. Kappos
*Director of the United States Patent and Trademark Office*